United States Patent

Kinjo et al.

[15] 3,651,279

[45] *Mar. 21, 1972

[54] COMMUTATOR CONTROLLED MAGNETIC RECORDING AND REPRODUCING SYSTEM

[72] Inventors: Hisao Kinjo, Yokohama; Toshi Suzuki, Kamakura, both of Japan

[73] Assignee: Victor Company of Japan, Limited, Yokohama, Japan

[ * ] Notice: The portion of the term of this patent subsequent to May 20, 1986, has been disclaimed.

[22] Filed: Jan. 13, 1969

[21] Appl. No.: 790,583

Related U.S. Application Data

[63] Continuation of Ser. No. 550,398, May 16, 1966, Pat. No. 3,445,608.

[30] Foreign Application Priority Data

May 21, 1965 Japan....................................40/29915

[52] U.S. Cl...................................179/100.2 T, 340/174.1 D

[51] Int. Cl..........................................................G11b 15/14

[58] Field of Search.......................179/100.2 T; 340/174.1 D

[56] References Cited

UNITED STATES PATENTS

| | | | |
|---|---|---|---|
| 2,648,589 | 8/1953 | Hickman | 179/100.2 |
| 3,005,056 | 10/1961 | Goldmark et al. | 179/100.2 |
| 3,117,188 | 1/1964 | Anderson et al. | 179/100.2 |
| 3,239,603 | 3/1966 | Kihara | 179/100.2 |
| 3,337,694 | 8/1967 | Nakamatsu | 179/100.2 |

*Primary Examiner*—Bernard Konick
*Assistant Examiner*—J. Russell Goudeau
*Attorney*—Louis Bernat

[57] ABSTRACT

A magnetic tape recorder for television video signals uses two sequentially active magnetic heads mounted on a revolving disk. A commutator is arranged to rotate in synchronism with the revolving disk and to act as a program switch for selecting the magnetic head switching points and for controlling the associated circuitry. The program selectively changes the instantaneous electrical characteristics of a path leading from the heads to the associated circuitry, these changes occurring as a function of whether one or two heads is operative at the instant of change.

6 Claims, 15 Drawing Figures

INVENTORS
HISAO KINJO
TOSHI SUZUKI

BY Louis Bernat
ATTORNEY

INVENTORS
HISAO KINJO
TOSHI SUZUKI

BY Louis Bernat
ATTORNEY

COMMUTATOR CONTROLLED MAGNETIC RECORDING AND REPRODUCING SYSTEM

This is a continuation of our copending application Ser. No. 550,398, filed May 16, 1966, entitled "Commutator Switching System For Rotating Heads Recorders," now U.S. Pat. No. 3,445,608 issued May 20, 1969, and assigned to the assignee of this invention.

This invention relates to magnetic tape recorders, and more particularly to systems for recording and reproducing video signals or the like.

Tape recorders of the type contemplated by this invention generally include two magnetic heads. These heads, mounted on diagonally opposite sides of a revolving disk, follow an orbit defined by the circumference of said disk and sequentially trace intermittent oblique tracks on a magnetic tape to record a video signal, a field at a time. During playback these same heads move along the same tracks to reproduce the previously recorded video signal. The problem is that the heads must be switched between active conditions at the ends of the tracks and switching must be accomplished without noise or deterioration of the picture.

To overcome these problems, the known tape recorder systems have tended to be very complex in construction and operation. Yet these known systems do not switch easily and without problems. They are not highly reliable and stable, and they generate noise, heat, interference components, and the like.

There is a considerable improvement in the known systems when a channel mixing system combines intermittent signals which are partially overlapped. The mixing system generally attenuates the signal from one of the heads in the overlap region. The overlapping portion of the signal at the lower signal strength level is masked by the other non-attenuated signal. Although a channel mixing system of this type can be highly satisfactory, it has heretofore required a complex electric circuit for processing overlapping portions of signals.

Accordingly, an object of this invention is to provide new and improved apparatus for magnetically recording and reproducing a video signal. A further object is to provide such apparatus which is very simple in construction. Yet another object is to enable the recording of a continuous signal in the form of intermittent signals and the playback of the intermittent signals as a continuous signal.

Another object is the provision of a novel and useful apparatus for magnetically recording and reproducing a video signal wherein overlapping portions of intermittent signals are processed at a commutator assembly.

In keeping with one aspect of the present invention, the above cited and other disadvantages are overcome by providing mechanical commutator means which rotates with the heads. The overlapping portions of the intermittent signals can be blended responsive to electric connections completed through the commutator to select the active one of the magnetic heads. The commutator also controls a stationary electrical circuit which attenuates one overlapping signal without requiring complex electronic circuits. The commutator means can be operative either during recording or playback to connect the attenuator means in circuit with one of the heads.

More particularly, the commutator means are provided for sequentially connecting a plurality of co-rotatable heads to a stationary circuit. While two of the heads are connected simultaneously to the stationary circuit during each overlap period, attenuator means are connected in a circuit with one of the heads. Thus, there is a difference in the levels of signal strength from the two heads during each overlap period, and the higher level signal masks the lower level signal. Even when there is a 180° phase difference between the two signals, an output signal of substantial amplitude can be produced. The arrangement is particularly advantageous in the recording and reproducing of frequency modulated signals. If a signal above a certain amplitude level is always applied to the demodulation circuit, an FM signal can be demodulated with high fidelity and with relatively great changes in amplitude.

According to a specific feature of the invention, the commutator means comprises a plurality of elements in the form of arcuately extending segments. A plurality of brushes engage the segments to connect one group of elements to the heads and another group to the stationary circuit. Preferably, the commutator segments are connected to the heads and the brushes are connected to the stationary circuit.

Another specific feature of the invention supports the brushes in side-by-side relation for engagement with side-by-side portions of the commutator segments. The brushes and segments are arranged so that two of the segments are engaged by two of the brushes.

According to a further feature of the invention, the attenuator means comprises a series resistor which is preferably connected between one of the brushes and the stationary circuit.

This invention contemplates other objects, features and advantages which will become apparent as the description proceeds with reference to the accompanying drawings wherein.

Figures 6A, 6B, 6C:
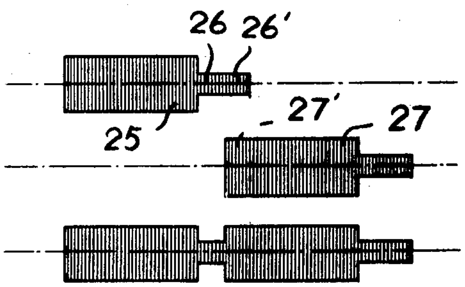
Figure 7:
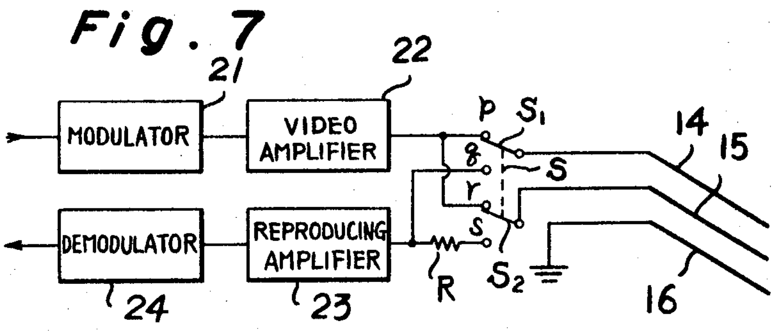

FIGS. 4(A), 4(B), 4(C) and 4(D) are diagrammatic stop motion plan views of the brushes in a signal changeover portion of the commutator assembly;

FIGS. 5(A), 5(B), 5(C) and 5(D) are simplified block diagrams showing the connection of magnetic heads during conditions respectively depicted in FIGS. 4(A), 4(B), 4(C) and 4(D);

FIGS. 6(A), 6(B), and 6(C) are wave form diagrams which explain the operation of the apparatus; and FIG. 7 is a schematic view of another embodiment of the apparatus according to the invention.

The illustrated embodiments of the commutator means are designed for a two-head magnetic recording reproducing system. More particularly, two magnetic heads are mounted on diagonally opposite sides of a rotating disk. These heads revolve in an orbit defined by the circumference of the disk. They are activated alternately to record or play back video signals in diagonal tracks on a magnetic tape. However, it should be understood that the invention can be applied to any type of system using a plurality of equiangularly spaced co-rotatable heads or the equivalent thereof.

Figure 1:
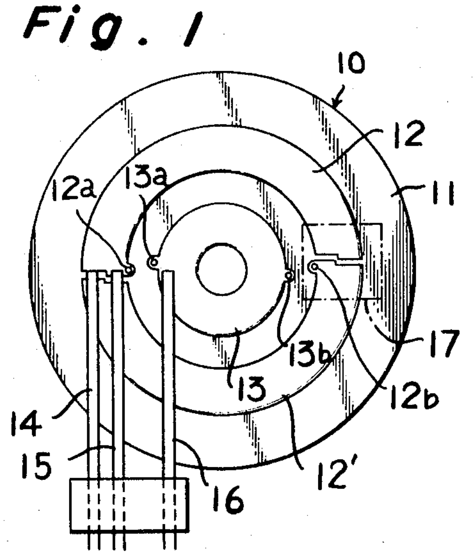
FIG. 1 is a plan view showing one embodiment of a commutator assembly for a magnetic tape recorded constructed according to this invention.
Figure 2:
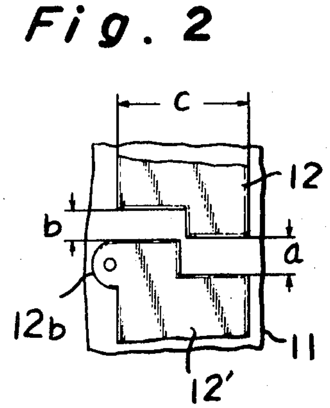
FIG. 2 is a fragmentary plan view, on an enlarged scale, of a signal changeover portion of the commutator assembly indicated by a broken line rectangle in FIG. 1.
Figure 3:
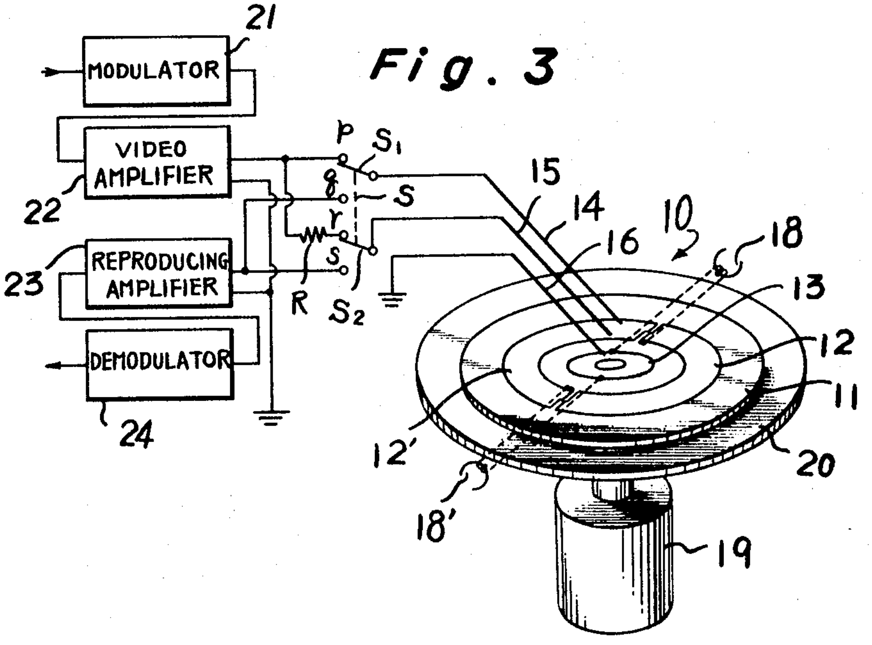
FIG. 3 is a schematic view of one embodiment of a magnetic tape recorder using the commutator assembly of FIG. 1.

In FIGS. 1 to 3, reference numeral 10 generally designates a commutator assembly constructed according to the invention. Preferably, the assembly includes a disk 11, formed by printing semicircular conductive segments 12 and 12' on a circular conductive segment 13 on electrically insulating material, such as bakelite. The segments 12, 12' and 13 are preferably of a special alloy which is highly resistant to frictional wear. Preferably, the circular conductive segment 13 is concentrically positioned in the center of the first-mentioned conductive segments 12 and 12', and it serves as a ground terminal. Reference numerals **12*a*, 12*b*, 13*a* and 13*b*** designate terminals for connecting the conductive segments to the two rotary mounted magnetic heads.

It is to be noted that the semicircular conductive segments 12 and 12' have ends adjacent each other. These ends form insulated interface gaps of substantially the same form in two diametrically opposite regions. One of these gaps, in a region 17, is shown in FIG. 2 in enlarged form. Brushes 14 and 15 bear on the semicircular conductive segments 12 and 12', and a brush 16 bears on the circular conductive segment 13. These brushes are preferably supported so that the free ends thereof are aligned along a radius of the disk 11. Thus, the brushes 14 and 15 make side-by-side contact with portions of the semicircular conductive segments 12 or 12'.

FIG. 2 is an enlarged scale view of the region indicated by the broken line rectangle 17 in FIG. 1. The adjacent or interfacing end portions of the semicircular conductive segments 12 and 12' are spaced apart in side-by-side relationship, a certain distance from each other.

The exact widths of gaps *a* and *b* may vary, depending upon the time interval during which the video signals overlap between the two orbiting magnetic heads. The circumferential length of each of the semicircular conductive segments 12, 12' is selected to coincide with the scanning time for transmitting one field of video signal to the corresponding rotary magnetic head. The widths of the gaps correspond to the areas of contact surfaces of the brushes. For example, gaps *a* and *b* may have a width such that the front ends of the brushes 14 and 15 do not come into simultaneous contact with the semicircular conductive segments 12 and 12'. These gaps are formed between the opposing ends of the semicircular conductive segments 12 and 12'. They are positioned on the right and left sides of the center line longitudinally dividing the segments into two equal parts across the width C thereof.

The commutator including the gaps *a* and *b* provide means for converting a continuous TV signal into intermittent signals, one such signal for each field. That is, one field is recorded on one track while brushes 14, 15 ride on one of the segments, and another field is recorded while they ride on the next segment. The gap width sets the time interval during which an intermittent signal is attenuated for processing an overlapping portion during playback and the time interval during which signals are overlapped during recording. In this embodiment, an intermittent signal is arranged such that it is attenuated (FIG. 6) for an interval which is four times as long as a horizontal synchronizing pulse interval (H). This attenuation occurs at a predetermined position in the vertical blanking interval. The front end portion 26, 26' of the attenuated signal is twice as long as the interval (H), and it overlaps a signal 27' of the next following field.

FIG. 3 is a perspective view schematically showing the commutator assembly 10 in association with rotary magnetic head units 18, 18'. The commutator assembly 10 is mounted on a shaft of an electric motor 19 and positioned above a rotating member 20 having the two magnetic heads 18 and 18' diametrically mounted on opposite positions thereof. Thus the heads and commutator always move as a unit.

It should be understood that the heads 18 and 18' are arranged to trace successive tracks, preferably diagonal, on a magnetic medium, such as a magnetic tape. The trace of each head begins before the end of the trace of the other head to produce overlap periods wherein the same signals are recorded on opposite ends of adjacent tracks, as is well known in the art.

The brushes 14, 15, and 16, which are in sliding contact with the segments on the commutator assembly, are connected to an input (or an output) of video signal magnetic recording (or reproducing) means. The brush 16 is connected to a common or ground terminal of the video signal magnetic recording and reproducing means. The brushes 14 and 15 are connected to center or working contacts $S_1$, $S_2$ of a relay S. The stationary contacts *p–s* are connected to input and output terminals of the video signal magnetic recording and reproducing means. The relay S is operated at the time when the video recorder system is switched from a recording operation to a playback operation, or vice versa.

When in the recording mode of operation, the operating contact members $S_1$ and $S_2$ are connected to contacts *p* and *r*, respectively. The input video signal is frequency modulated by a modulator 21, passed through a video amplifier 22, and applied to the brush 14. At this time, the brush 15 is also connected via an attenuating resistor R to amplifier 22. The brushes 14, 15 are connected in parallel with each other.

During playback, switch members $S_1$ and $S_2$ are connected to contacts *q* and *s*, respectively. The brushes 14 and 15 are connected to each other by the relay contacts, so that signals on brushes 14 and 15 are directly mixed with each other and without attenuation. Thus, intermittent signals from the rotary mounted magnetic heads are mixed with each other and converted into a continuous signal, which is introduced into a reproducing amplifier 23, and then passes through a demodulator 24 to become a reproduced and demodulated output signal.

During reproduction, the system of this invention converts intermittent signals into a continuous signal. The commutator assembly develops signals having a strength which varies in level in the overlap period which was formed during recording when an applied continuous signal was recorded as successive intermittent signals.

If the relay S is operated to set the apparatus to a recording condition, the video signal passes through the modulator 21 and amplifier 22 to the brush 14, and to the brush 15 via the damping or attenuating resistor R. The value of the damping resistor R is selected so that overlapping portions of the output signals reproduced from the magnetic tape are reduced by about −12 to −14 decibels.

The brushes 14 and 15 effectively move simultaneously, in a sliding motion, on the semicircular conductive segments 12 and 12', (it is not material whether the brushes move over the segments or the segments move past the brushes). When the brush 14 is disposed in the gap *a* between the opposing and interfacing ends of the semicircular conductive segments, no signal is transmitted through brush 14 to the rotary magnetic heads. The brush 15 is still disposed on a semicircular conductive segment, so that the signal damped or attenuated by the resistor R is transmitted to the rotary magnetic head.

The manner in which the overlapping portions of signals are processed by the brushes 14 and 15 will be explained with reference to FIGS. 4(A), 4(B), 4(C) and 4(D) which are four views, diagrammatically showing the positions of brushes 14 and 15 as they travel over the interface region between the semicircular conductive segments 12 and 12' before and after signals are overlapped.

FIGS. 5(A), 5(B), 5(C) and 5(D) are four views indicating the connection of the rotary magnetic heads 18 and 18' to the amplifier. The four views of FIG. 5 are states which correspond to the states of FIGS. 4(A), 4(B), 4(C) and 4(D), respectively.

FIGS. 6(A) and 6(B) are schematic representations of the wave forms of the signals recorded in tracks on the magnetic tape by the first and second rotary magnetic heads 18 and 18'. FIG. 6(C) is a schematic representation of the wave form of the reproduced signal which results from a combination of the wave forms of FIGS. 6(A) and 6(B).

Figures 4A, 4B, 4C, 4D:
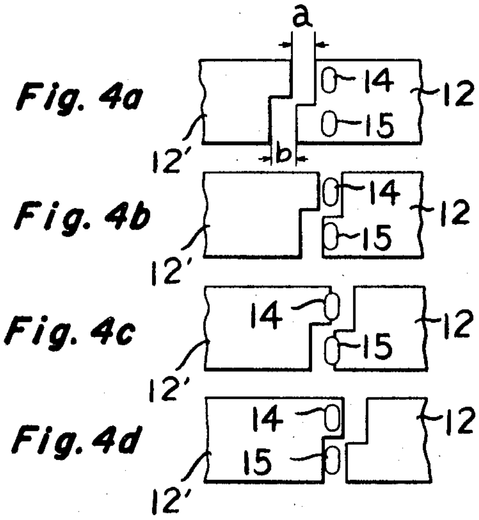
Figures 5A, 5B, 5C, 5D:
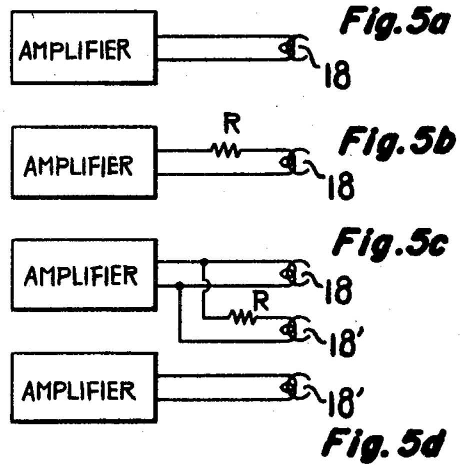

Let us assume that a signal having the duration of one field is transmitted to the semicircular conductive segment 12. FIG. 4(A) shows the positions of the brushes 14 and 15 immediately before the complete transmission of the signal through the semicircular conductive segment 12 to the rotary magnetic head 18. It will be observed that before the brushes 14 and 15 enter the interface gap, both brushes are in contact with the semicircular conductive segment 12. Thus, the signal being recorded, on the magnetic tape, is not damped or attenuated because the brush 15 (FIG. 3) is then short-circuited by the brush 14. At this time, the magnetic head 18 is connected in an active state as shown in FIG. 5(A), and the recorded signal has a form as shown at 25 in FIG. 6(A).

As the commutator disk 11 rotates and the brushes 14 and 15 are disposed as shown in FIG. 4(B), the brush 14 ceases to transmit the signal to the head 18. However, the brush 15 continues to transmit the signal to the head 18, and that signal is attenuated to have a signal strength which is at a level below the level of the signal transmitted by the brush 14. The attenuated signal is recorded on the magnetic tape, as shown at 26 (FIG. 6). At this time, the magnetic head 18 is still connected to the signal source via resistor R and brush 15, as shown in FIG. 5(B).

When the brushes 14 and 15 are shifted to the positions shown in FIG. 4(C), the input signal is transmitted through the brush 14 to the semicircular conductive segment 12'. The head 18' is switched from an inactive to an active state so that the signal of the second field is recorded in the next following intermittent track on the magnetic tape. The brush 15 is still engaged with the semicircular conductive segment 12 at this time. The signal of the second field, which is attenuated, is still being recorded at the trailing end of the preceding intermittent track. Thus, the rotary magnetic heads 18 and 18' are connected in parallel with each other, as shown in FIG. 5(C). The signal applied through the brush 15 is attenuated by the damping resistor R at the changeover portion of the operation of the rotary magnetic heads. The overlapping signals are, therefore, as shown at 26' and 27' in FIGS. 6(A) and 6(B), respectively. These are the signals which are simultaneously recorded at the trailing end and the leading end of the intermittent tracks by the rotary mounted magnetic heads 18 and 18', respectively.

When the brushes 14 and 15 are further shifted to the positions as shown in FIG. 4(D), the brush 15 is released from its contact with the semicircular conductive segment 12. The signal of the second field is then recorded on the magnetic tape via a circuit extending through the brush 14 and the rotary magnetic head 18'—which is connected as shown in FIG. 5(D). The head 18 is now switched to its inactive state. Thereafter, the overlapping portion is mechanically formed and recorded on the magnetic tape after a time interval which is about twice as long as the time interval (H) for each rotation of the commutator through 180°.

To playback the signals thus recorded on the magnetic tape, the relay S is set to the reproducing position. The brushes 14 and 15 are connected in parallel with each other as described hereinabove. The overlapping portions are taken out from the ends of said two tracks on the magnetic tape by the first and second rotary magnetic heads. They are directly mixed with each other to form a single continuous signal, as shown in FIG. 6(C). There is a variation in the level in signal strength of about −12 to −14 decibels. Thus, as the two signals overlap each other, there is transient state which generally prevents injurious effect on the overlapping signals. The signal having the lower level signal strength is absorbed by the signal of higher level strength, due to a masking effect. This feature is particularly advantageous in the case of recording and reproducing of frequency modulated signals.

FIG. 7 shows another embodiment of the apparatus of this invention. In the embodiment of FIGS. 1 to 6, one of the overlapping video signals has its level lowered during the recording operation. The recorded signals are played back without change and mixed with each other during reproduction. However, with the embodiment shown in FIG. 7, the video signals are recorded without alteration. The level of one of the signals is altered during playback.

In the recording operation, the movable contact switch members $S_1$ and $S_2$ are brought into contact with stationary contacts *p* and *r*. The video signals passing through the modulator 21 and amplifier 22 are recorded, without having their levels affected in any way. Again the magnetic heads 18 and 18' successively become active to record intermittent signals in tracks adjacent each other on the magnetic tape, and with parts of the signals overlapping one over the other.

During the playback operation, the operating contact switch members $S_1$ and $S_2$ are brought into contact with the contacts *q* and *s*. One of the video signals taken out via the brushes 14 or 15 is passed through the resistor R, and its level is lowered in the same manner as in the recording operation with the first mentioned embodiment. This permits the processing of overlapping signals. Thus, the last mentioned embodiment (FIG. 7) makes it possible to simultaneously carry out the processing of overlapping signals and the mixing of the two signals during reproduction.

Since many different embodiments of this invention may be made without departing from the spirit and scope thereof, it is to be understood that we do not limit ourselves to the specific embodiments herein, but do intend to cover all equivalents falling within the invention.

We claim:

1. A magnetic tape recorder comprising a plurality of magnetic heads mounted to revolve about an orbit, commutator means associated with and revolving in unison with said heads for generating signals indicative of the instantaneous positions of said heads, means responsive to signals generated by said commutator for selectively controlling the active conditions of said heads, wherein said commutator comprises a plurality of arcuate electrically conductive segments separated by insulated gaps and means including at least two associated brushes for tracing a path across said segments and gaps, said segments and brushes being associated with each other so that one of said brushes engages an insulated gap before the other engages said gap, said one brush leaving said insulated gap and engaging the next segment before the other engages said gap, at least one of said brushes always engaging one of said electrically conductive segments, said means for controlling the active conditions of said heads being operated responsive to signals picked up by said brushes, means coupled via one of said brushes for attenuating a signal, and means for connecting said two brushes in parallel whereby said other brush shunts said attenuating means except when said other brush is on an insulated gap.

2. A magnetic tape recording and reproducing apparatus comprising means having at least two magnetic heads mounted to rotate in a circular path, means comprising at least two signal paths extending between said heads and external circuitry, said two paths having different electrical characteristics, and programming means synchronously rotating with said heads for selectively connecting at least one of said heads with predetermined ones of said paths responsive to the instantaneous positioning of said heads.

3. A rotating disc having at least two magnetic recording and reproducing heads associated therewith, signal path means leading from said heads to external circuitry, programming means synchronously rotating as a unit with said heads for selectively enabling either or both of said heads to be operative either individually or jointly, and means responsive to said programming means for producing different instantaneous signal transmission characteristics in said path means as a function of the instantaneous enabling of either head individually or both heads jointly.

4. A magnetic tape recorder for recording signals having periodic variations, said recorder comprising electrical and mechanical components which experience periodic variations corresponding to said signal variations, means including a rotatable member having at least one magnetic head mounted on the periphery thereof, whereby said head moves in an orbital path as said member rotates, the period of said orbit coinciding with the period of said signal variations, a surface associated with said rotating member having a pattern of electrically insulating and conductive material thereon, said material having a pattern according to a program corresponding to said periodic signal variations and synchronously coinciding with the period of the orbit of said head, means associated with said member for selectively detecting the changes in said program responsive to the instantaneous position of said insulating and conductive material, and means responsive to said detected changes for selectively controlling the periodic variations of said electrical and mechanical components, the periodic variations of said electrical components including a change in the transmission characteristics of a path including such components.

5. A multihead magnetic recorder and playback apparatus comprising means for sequentially switching any selected one of the heads between active and inactive states, first means whereby said heads record only when in said active state, second means whereby said heads play back only when in said active state, means for attenuating signals in any selected one of said heads, commutator means for controllingly selecting said switching and attenuating means, said commutator including a plurality of adjacent segments of electrically conductive material scanned by a plurality of brushes for establishing a timed sequence wherein: one of said heads is first switched between its active and inactive states, then signals from a head are attenuated, and thereafter another of the heads is switched between its active and inactive states; wherein the interfacing ends of the adjacent segments are shaped to establish said timed sequence, and said plurality of brushes scan said segments, said brushes entering and leaving said interfacing ends in a sequence which controls said switching and attenuation means, wherein said brushes scan in parallel over said segments, at least one of said brushes having said attenuation means associated therewith whereby said signals are attenuated if said one brush scans alone and said attenuation means is shunted if another brush scans in parallel with said one brush.

6. The apparatus of claim 5 and a magnetic recording medium, and means for applying a televising signal to the active one of said active heads for recording said signals on said medium.

* * * * *